(12) United States Patent
Kochidomari et al.

(10) Patent No.: US 8,403,094 B2
(45) Date of Patent: Mar. 26, 2013

(54) POWER UNIT AND VEHICLE EQUIPPED WITH IT

(75) Inventors: Yoshitaka Kochidomari, Amagasaki (JP); Shuji Nishimoto, Amagasaki (JP); Larry Swanson, Horicon, WI (US); Jamie Kovalaske, Charlotte, NC (US); Jeremie Wade, Charlotte, NC (US); Nicholas Biersdorf, Charlotte, NC (US)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 548 days.

(21) Appl. No.: 12/614,147

(22) Filed: Nov. 6, 2009

(65) Prior Publication Data
US 2010/0263958 A1    Oct. 21, 2010

(30) Foreign Application Priority Data

Apr. 15, 2009    (JP) .................................. 2009-99291

(51) Int. Cl.
*B60K 17/34*    (2006.01)
(52) U.S. Cl. ........................................ 180/233; 180/366
(58) Field of Classification Search .................. 180/233, 180/366, 248, 251; 474/144, 150
See application file for complete search history.

(56) References Cited

U.S. PATENT DOCUMENTS

| 4,699,234 A | * | 10/1987 | Shinozaki et al. ............. 180/233 |
| 4,809,796 A | * | 3/1989 | Yamaoka et al. ............. 180/6.48 |
| 4,854,413 A | * | 8/1989 | Kameda et al. ............... 180/247 |
| 4,854,414 A | * | 8/1989 | Koide et al. .................... 180/247 |
| 4,856,611 A | * | 8/1989 | Teraoka et al. ............... 180/233 |
| 4,899,859 A | * | 2/1990 | Teraoka ........................ 192/221 |

(Continued)

FOREIGN PATENT DOCUMENTS

JP    S59-120627 U    8/1984

(Continued)

OTHER PUBLICATIONS

Notice of Reasons for Refusal in JP 2009-099291, Japanese Patent Office, issued Jan. 8, 2013, 7 pages (with English Translation).

*Primary Examiner* — Anne Marie Boehler
*Assistant Examiner* — Maurice Williams
(74) *Attorney, Agent, or Firm* — Sterne, Kessler, Goldstein & Fox, P.L.L.C.

(57) ABSTRACT

A power unit includes an engine, a belt transmission driven by the engine, and a second transmission driven by the belt transmission. The engine includes an engine output shaft having an end portion projecting outward from the engine. The second transmission includes a transmission input shaft and a transmission output shaft having respective end portions projecting outward from the second transmission. The belt transmission includes a drive pulley provided on the end portion of the engine output shaft, a driven pulley provided on the end portion of the transmission input shaft, and a belt looped over the drive and driven pulleys. The belt has first and second portions between the drive and driven pulleys. The first portion runs from the drive pulley to the driven pulley. The second portion runs from the driven pulley to the drive pulley. The end portion of the transmission output shaft is extended through a portion of the belt transmission between the drive and driven pulleys and between the first and second portions of the belt so as to project outward from the belt transmission.

18 Claims, 10 Drawing Sheets

U.S. PATENT DOCUMENTS

| | | | |
|---|---|---|---|
| 5,162,025 A * | 11/1992 | Carriere | 475/221 |
| 5,205,373 A * | 4/1993 | Kadokura et al. | 180/248 |
| 6,000,296 A * | 12/1999 | Sundquist | 74/473.12 |
| 6,964,310 B2 * | 11/2005 | Hasegawa | 180/24.09 |
| 7,377,351 B2 | 5/2008 | Smith et al. | |
| 2004/0102267 A1 * | 5/2004 | Murakami et al. | 474/69 |
| 2009/0045026 A1 * | 2/2009 | Ishii et al. | 192/87.14 |

FOREIGN PATENT DOCUMENTS

| | | |
|---|---|---|
| JP | S62-188849 A | 8/1987 |
| JP | H02-200526 A | 8/1990 |
| JP | H10-297295 A | 11/1998 |
| JP | 2006-76548 | 3/2006 |
| JP | 2008-87739 A | 4/2008 |

* cited by examiner

POWER UNIT AND VEHICLE EQUIPPED WITH IT

BACKGROUND OF THE INVENTION

1. Field of the Invention

The present invention relates to a power unit including an engine, a belt transmission driven by the engine, and a second transmission, such as a gear transmission, driven by the belt transmission, and relates to a vehicle, especially, a multi-wheel drive vehicle such as a four-wheel drive vehicle, equipped with the power unit.

2. Related Art

As disclosed in JP 2006-76548A, a four-wheel drive utility vehicle, serving as a conventional typical multi-wheel drive vehicle, is equipped with a power unit for driving both a front wheel axle and a rear wheel axle. The power unit includes an engine, a belt transmission driven by the engine, and a second transmission, such as a gear transmission, driven by the belt transmission. The second transmission includes a first output portion for driving one of the front and rear wheel axles, and a second output portion for driving the other of the front and rear wheel axles.

This conventional power unit is configured so that, when it is equipped on a vehicle, an engine output shaft of the engine is extended to have a horizontal axis in a lateral direction of the vehicle, and the second transmission is disposed immediately rearward (or, when occasion demands, immediately forward) of the engine so as to extend its own transmission shafts having horizontal axes in the lateral direction of the vehicle. One of the transmission shafts is a transmission input shaft serving as an input shaft of the second transmission. The engine output shaft and the transmission input shaft project, at respective end portions, thereof outward from the engine and the transmission toward one of either the right or left sides of the vehicle. The belt transmission is disposed on either a right or left side of the engine and the second transmission so as to drivingly connect the outwardly projecting end portion of the transmission input shaft to the outwardly projecting end portion of the engine output shaft. Hereinafter, this conventional power unit for a multi-wheel drive vehicle is referred to as a lateral axial power unit.

In the lateral axial power unit as disclosed in the above-mentioned reference, the second transmission carries and drives a rear wheel axle so as to serves as a rear transaxle of the vehicle. In the vehicle, a front transaxle carrying and driving a front wheel axle is disposed opposite to the second transmission in the fore-and-aft direction of the vehicle with respect to the engine. The second transmission has a gear housing portion for driving the front transaxle, serving as the above-mentioned second output portion for driving the front wheel axle. The gear housing portion projects outward from the second transmission laterally opposite to the belt transmission, and a front-wheel driving power take-off (PTO) shaft projects forward from the gear housing portion, whereby the gear housing portion, the PTO shaft, and a propeller shaft extended from the PTO shaft toward the front transaxle are prevented from interfering with the engine and the belt transmission.

In the lateral axial power unit, the second output portion of the second transmission can overlap the belt transmission in the vertical direction of the vehicle so as to reduce a vertical length of the power unit because it is disposed opposite to the belt transmission in the lateral direction of the vehicle. However, the lateral axial power unit is restricted in its minimization in the lateral direction of the vehicle, because of the horizontal axes of the engine output shaft and the transmission shafts of the second transmission extended in the lateral direction of the vehicle, and because of the lateral opposite arrangement of the belt transmission and the second output portion of the second transmission.

As disclosed in each of JP H02-200526A, JP H10-297295A and U.S. Pat. No. 7,377,351, an alternative conventional power unit for a multi-wheel drive vehicle includes an engine, a belt transmission driven by the engine, and a second transmission having first and second output portions for respective front and rear wheel axles and driven by the belt transmission. In this power unit, an engine output shaft of the engine has a horizontal axis in a fore-and-aft direction of a vehicle. The second transmission is disposed on one of right and left sides of the engine. Transmission shafts of the second transmission have respective horizontal axes in the fore-and-aft direction of the vehicle.

One of the transmission shafts of the second transmission is a transmission input shaft serving as an input shaft of the transmission shafts. The engine output shaft and the transmission input shaft have end portions projecting forward or rearward from the engine and the second transmission in the vehicle. The belt transmission is disposed on one of the front and rear sides of the engine and the second transmission so as to drivingly connect the end portions of the engine output shaft and the transmission input shaft to each other. More specifically, when the belt transmission is disposed on the front or rear side of the engine and the second transmission, a drive pulley is provided on the end portion of the engine output shaft, a driven pulley is provided on the end portion of the transmission input shaft, and a belt is looped over the drive and driven pulleys. Hereinafter, this power unit for a multi-wheel drive vehicle is referred to as a fore-and-aft axial power unit.

As understood from the above description, in comparison with the lateral axial power unit, the fore-and-aft axial power unit is advantageous in its minimization in the lateral direction of the vehicle because the engine output shaft and the transmission shafts of the second transmission have respective horizontal axes in the fore-and-aft direction of the vehicle, and the belt transmission is disposed on one of front and rear sides of the vehicle.

In each of the fore-and-aft axial power units disclosed in the above-mentioned three references, the second transmission includes a transmission output shaft for driving both a front wheel axle and a rear wheel axle. In this regard, a front transaxle carrying and driving the front wheel axle is disposed forward from the power unit, and a rear transaxle carrying and driving the rear wheel axle is disposed rearward from the power unit. A front end portion of the transmission output shaft projects forwardly outward from the second transmission so as to be drivingly connected to the front transaxle, and a rear end portion of the transmission output shaft projects rearwardly outward from the second transmission so as to be drivingly connected to the rear transaxle. Thus, one of the front and rear end portions of the transmission output shaft projects outward from the second transmission at the front or rear side of the second transmission that is on the same side as the belt transmission. This front or rear end portion of the transmission output shaft is disposed below the end portion of the transmission input shaft, and more specifically, below a bottom end of a portion of the belt transmission having a portion with the belt wound around the driven pulley on the end portion of the transmission input shaft. Hereinafter, this portion of the belt transmission is referred to as the portion of the belt transmission around the driven pulley, or is simply referred to as the portion of the belt transmission. In other words, at the front or rear side of the second transmission, the end portion of the transmission output shaft and the portion of the belt transmission around the driven pulley are vertically offset from each other, thereby being prevented from interfering with each other.

Regarding heights of the respective end portions of the engine output shaft and the transmission input shaft, as disclosed in U.S. Pat. No. 7,377,351, the end portion of the engine output shaft is lower than the end portion of the transmission input shaft so that a portion of the belt wound around the drive pulley is lower than the portion of the belt wound around the driven pulley, thereby vertically slanting the belt transmission. Alternatively, as disclosed in JP H02-200526A, the end portion of the engine output shaft and the end portion of the transmission input shaft are leveled at substantially the same heights so that the belt has a substantially horizontal upper or lower portion between the drive and driven pulleys.

JP H02-200526A also discloses an alternative fore-and-aft axial power unit. In this power unit, at either the front or rear end of the second transmission from which the end portion of the transmission input shaft projects outward, the end portion of the transmission output shaft projects forward or rearward on a lateral distal side of the end portion of the transmission input shaft (i.e., laterally opposite to the end portion of the engine output shaft with respect to the end portion of the transmission input shaft), and more specifically, on a lateral distal side of a lateral distal end of the portion of the belt wound around the driven pulley (i.e., laterally opposite to the drive pulley with respect to the driven pulley). In other words, the end portion of the transmission output shaft is offset from the belt of the belt transmission in the lateral direction of the vehicle.

SUMMARY OF THE INVENTION

As understood from the above description, the fore-and-aft axial power unit is desirable if its minimization in the lateral direction of the vehicle is weighed. However, the above-mentioned fore-and-aft axial power unit, having the vertical offset arrangement of the transmission output shaft and the portion of the belt transmission around the driven pulley, necessarily has a long vertical length, as much as the vertical gap between the end portion of the transmission output shaft and the portion of the belt transmission. To ensure a sufficient ground clearance of the vehicle, the power unit must be arranged to have a top end of the portion of the belt transmission at a high position, so that a free layout space of the vehicle upward of the power unit may be restricted, and the center of gravity of the vehicle may be raised so as to reduce stability of the vehicle during turning. If the top end of the portion of the belt transmission is lowered, a bottom end of the power unit may be too low to ensure sufficient ground clearance of the vehicle. To sufficiently lower the top of the portion of the belt transmission while ensuring sufficient ground clearance, it may be noticed that the vertical gap between the transmission input shaft and the transmission output shaft should be reduced as far as the end portion of the transmission output shaft does not interfere with the belt transmission. However, reduction of the gap between the transmission input shaft and the transmission output shaft causes a complication of the mechanism of the second transmission because it requires an increase of the number of gears for ensuring a required gear ratio between the transmission input shaft and the transmission output shaft, for example, thereby spoiling its facility of assembling and maintenance.

Incidentally, the above-mentioned fore-and-aft axial power unit, having the end portion of the transmission output shaft laterally offset from the belt of the belt transmission, spoils its advantage in minimization in the lateral direction of the vehicle because the arrangement of the end portion of the transmission output shaft expands the power unit in the lateral direction of the vehicle.

A first object of the invention is to provide a power unit adaptable as the fore-and-aft axial power unit for a multi-wheel drive vehicle, wherein the power unit is satisfactorily vertically minimized, without reduction of a gap between a transmission input shaft and a transmission output shaft in a second transmission complicating the second transmission, so as to ensure a sufficient free layout space of a vehicle above the power unit and sufficient ground clearance of the vehicle below the power unit, in addition to the peculiar advantage of the fore-and-aft axial power unit in minimization in the lateral direction of the vehicle.

To achieve the first object, a power unit according to the invention includes an engine, a belt transmission driven by the engine, and a second transmission driven by the belt transmission. The engine includes an engine output shaft having an end portion projecting outward from the engine. The second transmission includes a transmission input shaft and a transmission output shaft having respective end portions projecting outward from the second transmission. The belt transmission includes a drive pulley provided on the end portion of the engine output shaft, a driven pulley provided on the end portion of the transmission input shaft, and a belt looped over the drive and driven pulleys. The belt has first and second portions extended between the drive and driven pulleys. The first portion runs from the drive pulley to the driven pulley, and the second portion runs from the driven pulley to the drive pulley. The end portion of the transmission output shaft is extended through a portion of the belt transmission between the drive and driven pulleys and between the first and second portions of the belt so as to project outward from the belt transmission.

Therefore, due to the extension of the end portion of the transmission output shaft through the portion of the belt transmission between the drive and driven pulleys and between the first and second portions of the belt, a vertical gap between the end portion of the transmission output shaft and the end portion of the transmission input shaft can be reduced or eliminated while compensatively ensuring a sufficient horizontal gap between the transmission input shaft and the transmission output shaft for simplifying a structure of the second transmission. Accordingly, the power unit can be vertically minimized while ensuring its minimization in an alignment direction of the engine and the second transmission. When a vehicle is equipped with the power unit so that the alignment direction of the engine and the second transmission corresponds to a lateral direction of the vehicle, the vehicle ensures sufficient free layout space above the power unit and sufficient ground clearance below the power unit while ensuring minimization in the lateral direction thereof.

Preferably, the end portion of the engine output shaft and the end portion of the transmission output shaft are disposed at substantially equal heights. Therefore, the vertical gap between the end portion of the transmission input shaft and the end portion of the transmission output shaft is minimized so as to achieve the vertical minimization of the power unit, thereby ensuing the above-mentioned effects of the power unit and the vehicle equipped with the power unit.

The transmission output shaft has another end portion projecting outward from the second transmission opposite to the belt transmission. Therefore, the power unit is adaptable to a multi-wheel drive vehicle having a plurality of drive axles, so that one of the opposite end portions of the transmission output shaft is drivingly connected to one drive axle (e.g., a front wheel axle) and the other of the opposite end portions of the transmission output shaft is drivingly connected to another drive axle (e.g., a rear wheel axle).

A second object of the invention is to provide a multi-wheel drive vehicle equipped with a fore-and-aft axial power unit, wherein the power unit is satisfactorily vertically minimized, without reduction of a gap between a transmission input shaft and a transmission output shaft in a second transmission complicating the second transmission, so as to ensure sufficient free layout space of the vehicle above the power unit and a sufficient ground clearance of the vehicle below the power unit, in addition to the peculiar advantage of the fore-and-aft axial power unit in minimization in the lateral direction of the vehicle.

To achieve the second object, a vehicle according to the invention includes a power unit, a front transaxle, and a rear transaxle. The power unit includes an engine, a belt transmission driven by the engine, and a second transmission driven by the belt transmission. The front transaxle and the rear transaxle are driven by the second transmission. The engine includes an engine output shaft projecting forwardly or rearwardly outward from the engine. The second transmission includes a transmission input shaft, having an end portion projecting forwardly or rearwardly outward from the second transmission, and a transmission output shaft, having a pair of front and rear end portions projecting forwardly and rearwardly outward from the second transmission opposite to each other. The front end portion of the transmission output shaft is drivingly connected to the front transaxle, and the rear end portion of the transmission output shaft is drivingly connected to the rear transaxle. The belt transmission includes a drive pulley provided on the end portion of the engine output shaft, a driven pulley provided on the end portion of the transmission input shaft, and a belt looped over the drive and driven pulleys. The belt has first and second portions extended between the drive and driven pulleys. The first portion runs from the drive pulley to the driven pulley, and the second portion runs from the driven pulley to the drive pulley. The front or rear end portion of the transmission output shaft is extended through a portion of the belt transmission between the drive and driven pulleys and between the first and second portions of the belt so as to project outward from the belt transmission.

Therefore, in the power unit, due to the extension of the end portion of the transmission output shaft through the portion of the belt transmission between the drive and driven pulleys and between the first and second portions of the belt, a vertical gap between the end portion of the transmission output shaft and the end portion of the transmission input shaft can be reduced or eliminated while compensatively ensuring a sufficient horizontal gap between the transmission input shaft and the transmission output shaft for simplifying a structure of the second transmission. Accordingly, the power unit can be vertically minimized while ensuring its minimization in an alignment direction of the engine and the second transmission. When the vehicle is equipped with the power unit so that the alignment direction of the engine and the second transmission corresponds to a lateral direction of the vehicle, the vehicle ensures sufficient free layout space above the power unit and sufficient ground clearance below the power unit while ensuring minimization in the lateral direction thereof.

Preferably, at least one of the front and rear transaxles is drivingly connected to the corresponding front or rear end portion of the transmission output shaft via a propeller shaft and a pair of joints provided on respective opposite ends of the propeller shaft. Therefore, due to the propeller shaft and the joint, the power unit surely transmits power to the at least one of the front and rear transaxles even if the power unit is distant from the at least one of the front and rear transaxles in the vehicle.

Further, the joints are universal joints. Therefore, due to the universal joints, the propeller shaft or an input portion of the at least one of the front and rear transaxles does not have to be coaxial to the corresponding end portion of the transmission output shaft, thereby enhancing a degree of freedom in arrangement of the at least one of the front and rear transaxles relative to the power unit.

Alternatively, the propeller shaft and the transmission output shaft are extended coaxially to each other via the joint. Therefore, the efficiency of power transmission from the transmission output shaft to the propeller shaft is enhanced so as to reduce power loss. Further, the joints do not or scarcely have axial deviation of the connected shaft ends or bending of power transmission course, thereby reducing noise or vibration caused by the deviation or the bending, and thereby improving comfort of the vehicle.

Further to the coaxial arrangement of the propeller shaft and the transmission output shaft, at least one of the joints is a universal joint. Therefore, even if the coaxially arranged shafts have a little axial deviation therebetween, the universal joint absorbs the deviation so as to reduce required accuracy in the coaxial arrangement of shafts.

Alternatively, further to the coaxial arrangement of the propeller shaft and the transmission output shaft, at least one of the joints is a coaxial joint. Therefore, the shafts are rigidly connected to each other via the coaxial joint so as to enhance the effect of reducing noise and vibration. Further, the coaxial joint is economical in comparison with a universal joint.

Preferably, the coaxial joint is configured so that an end of one shaft having a splined outer peripheral surface is inserted into an end of the other shaft having a splined inner peripheral surface. Therefore, the coaxial joint is constituted only by processing the shaft ends to be joined to each other, and needs no additional member, thereby reducing the number of components and costs.

In another embodiment, the coaxial joint includes a cylindrical member having opposite open ends and a splined inner peripheral surface, and ends of the shafts having respective splined outer peripheral surfaces are inserted into the cylindrical members through the respective opposite open ends of the cylindrical member so that the cylindrical member is fitted at the splined inner peripheral surface thereof on the splined outer peripheral surfaces of the ends of the respective shafts. Therefore, the ends of the shafts need only simple processing for forming splines (e.g., forming a hole adapted to having an end of a partner shaft fitted therein, or forming spines on an inner peripheral surface of the hole) and do not need complicated processing, thereby economically simplifying the processing of the propeller shaft and the transmission shaft.

Preferably, in the vehicle, a base having an opening covers the belt transmission of the power unit, and a driver's seat is mounted on the base so as to cover the opening. The seat is movable so as to open the opening of the base for enabling access to the belt transmission via the opening. Therefore, a space below the driver's seat is utilized for arranging the belt transmission so as to reduce a dead space, thereby minimizing the vehicle. Further, due to the easy access to the belt transmission, the belt transmission is improved in maintenance-ability. Additionally, the base of the driver's seat serves as a cover for covering the opening for access to the belt transmission, thereby reducing costs.

Preferably, in the vehicle, the power unit is disposed at a fore-and-aft intermediate portion of the vehicle between the front and rear transaxles so as to overlap a driver's seat when viewed in plan. Therefore, the vehicle is concentrically weighted at the fore-and-aft intermediate portion so as to be surely balanced in the fore-and-aft direction thereof.

These and other objects, features and advantages of the invention will appear more fully in the following detailed description with reference to attached drawings.

DETAILED DESCRIPTION OF THE INVENTION

Embodiments of the inventions will be described. Hereinafter, positions and directions of respective elements and portions will be referred to on an assumption that an arrow F in each of drawings designates a forward traveling direction of a four-wheel drive utility vehicle serving as a multi-wheel drive vehicle.

Figure 1:
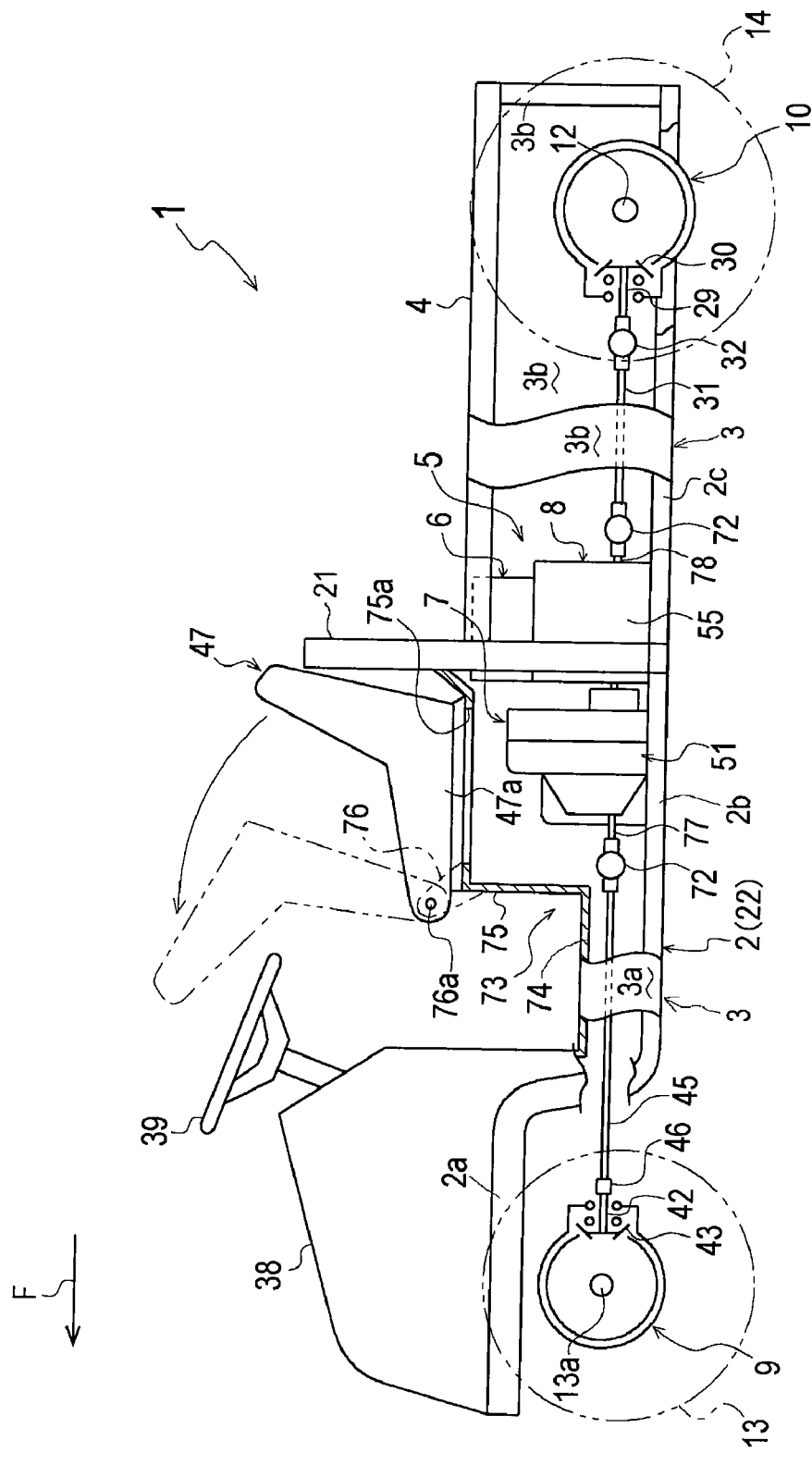
FIG. 1 is an entire side view of a four-wheel drive utility vehicle serving as a typical multi-wheel drive vehicle equipped with a representative power unit 5 according to an embodiment of the invention.
Figure 2:
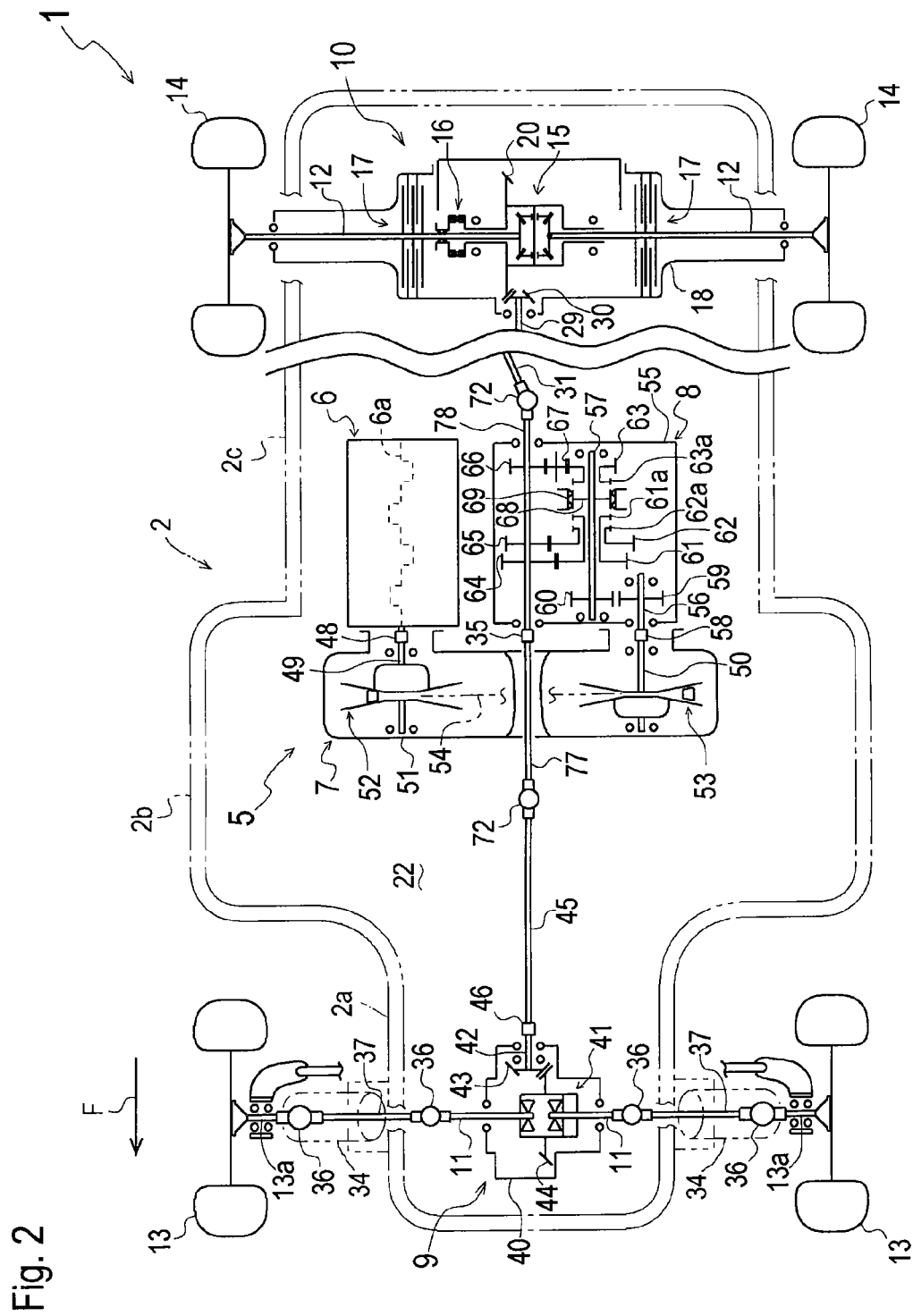
FIG. 2 is a skeleton diagram as a schematic plan view of a power transmission system in the four-wheel drive utility vehicle equipped with power unit 5.
Figure 3:
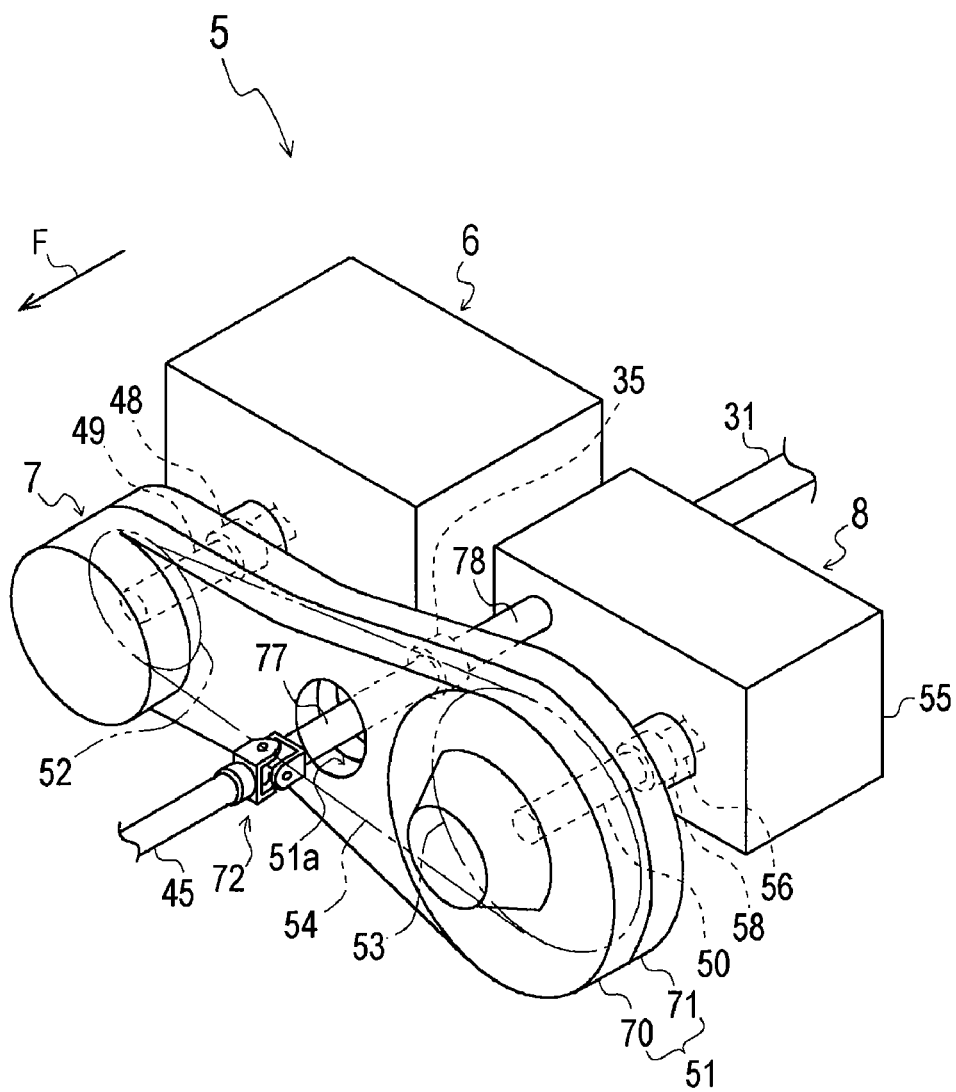
FIG. 3 is a perspective front view of power unit 5.

Referring to FIGS. 1 and 2, a general structure of a four-wheel drive utility vehicle 1 (hereinafter, simply referred to as vehicle 1) will be described. A frame 2 and fenders 3 (including fenders 3a and 3b) provided upright on right, left and rear ends of frame 2 constitute a vehicle body of vehicle 1. A bottom plate (not shown) is spread over a bottom end of entire frame 2 and is surrounded by fenders 3 so as to support a power unit 5 mounted on a top surface thereof at a substantially fore-and-aft middle portion of vehicle 1.

Frame 2 includes a front frame portion 2a, a middle frame portion 2b and a rear frame portion 2c, which are joined to one another so as to continue in the fore-and-aft direction of vehicle 1. A vertical partition plate 21 is provided upright on a rear end of middle frame portion 2b (or on a front end of rear frame portion 2c). Rear frame portion 2c is extended rearward from partition plate 21 so as to be rectangular when viewed in plan. Right and left fenders 3b, extended rearward from partition plate 21 on the right and left ends of rear frame portion 2c, and rear fender 3b, provided on the rear end of rear frame portion 2c, are provided on tops thereof with a cargo deck 4, which covers a space therebelow over rear frame portion 2c surrounded by right, left and rear fenders 3b and partition plate 21.

Power unit 5 includes an engine 6, a belt transmission 7 driven by engine 6, and a gear transmission 8 serving as a second transmission driven by belt transmission 7. In the space below cargo deck 4 over rear frame portion 2c, engine 6 and gear transmission 8 are mounted on a portion of the bottom plate over a front bottom portion of rear frame portion 2c so as to be juxtaposed right and left in vehicle 1. In power unit 5 of this embodiment, when viewed in the direction designated by arrow F, engine 6 is disposed rightward of vehicle 1, and gear transmission 8 is disposed leftward of vehicle 1. A rear transaxle 10 is disposed rearward from power unit 5, i.e., engine 6 and gear transmission 8, and is supported by a rear portion of rear frame portion 2c and the bottom plate at a substantially laterally middle rear position of vehicle 1. Cargo deck 4 may be detachable or vertically rotatable so as to open the space therebelow over rear frame portion 2c for facilitating access to power unit 5 and rear transaxle 10.

Rear transaxle 10 includes a housing 18 carrying a pair of right and left rear axles 12. A pair of right and left rear wheels 14 are disposed on right and left outsides of rear frame portion 2c, and are fixed on distal ends of respective rear axles 12 projecting laterally outward from right and left ends of housing 18. Housing 18 incorporates a differential unit 15, of a usual differential gear type or the like, provided with a differential lock device 16, and incorporates a pair of right and left brake devices 17, such as frictional type brake devices, provided on respective rear axles 12. Differential lock device 16 is provided on one of right and left rear axles 12 (in vehicle 1 according to this embodiment, on right rear axle 12). Differential lock device 16 is normally set to allow the differential rotation of axles 12 via differential unit 15. When a differential lock operation device (not shown) is operated for differential lock, differential lock device 16 is actuated to lock rear axles 12 to each other via differential unit 15.

An input shaft 29 of rear transaxle 10 is extended to have a horizontal axis in the fore-and-aft direction of vehicle 1, is journalled by a front portion of housing 18, and projects at a front end portion thereof forward from the front portion of housing 18. In housing 18, a bevel gear 30 is fixed on a rear end of input shaft 29 and meshes with a bevel input gear 20 of differential unit 15. A rear propeller shaft 31 is extended rearward from gear transmission 8 of power unit 5, and is drivingly connected at a rear end thereof to the projecting front end portion of input shaft 29 via a universal joint 32, so as to transmit power outputted from gear transmission 8 of power unit 5 to input shaft 29 of rear transaxle 10. Rear transaxle 10 transmits the power of input shaft 29 to right and left rear axles 12 via differential unit 15 so as to drive rear wheels 14 fixed on the distal ends of respective rear axles 12.

Frame 2 is extended at middle frame portion 2b horizontally forward from partition plate 21 at the same height with rear frame portion 2c, and is bent upward at a front end of middle frame portion 2b, so that front frame portion 2a extended horizontally forward from the front end of middle frame portion 2b is higher than middle frame portion 2b by a step. In this regard, the bottom plate is bent along the bending of frame 2 between front and middle frame portions 2a and 2b. Engine 6 and gear transmission 8 slightly projects at respective front end surfaces thereof forward from partition plate 21. Belt transmission 7 is disposed along the front end surfaces of engine 6 and gear transmission 8 and is mounted on the bottom plate over middle frame portion 2b.

A front transaxle 9 is disposed forward from belt transmission 7 of power unit 5, and is supported by front frame portion 2a and the bottom plate at a substantially laterally middle front position of vehicle 1. Front transaxle 9 includes a housing 40 carrying a pair of right and left front axles 11. Right and left front axles 11 project at respective distal ends thereof laterally outward from respective right and left ends of housing 40. A pair of right and left front wheels 13 are disposed on lateral distal sides of respective right and left ends of front frame portion 2a. An axial shaft 13a of each front wheel 13 is drivingly connected to the distal end of corresponding front axle 11 via universal joints 36 and a propeller shaft 37. Front wheels 13 are steerably suspended from front frame portion 2a via respective right and left suspensions 34, such as coiled springs or shock absorbers. Therefore, front wheels 13 serve as steerable drive wheels.

A front cover 38 covers front frame portion 2a. An instrument panel is disposed on a top rear end portion of front cover 38, and a steering wheel 39 is disposed upward and rearward from the instrument panel so as to be manipulated for steering front wheels 13.

A driver's seat 47 is disposed rearward from steering wheel 39 and is mounted on a seat mount base 75 of a mid cover 73 covering a space above middle frame portion 2b at a fore-and-aft intermediate portion of vehicle 1. In this regard, right and left fenders 3a are provided upright on right and left ends of middle frame portion 2b, and mid cover 73 is disposed between upper edges of right and left fenders 3a. As shown in FIG. 1, mid cover 73 is step-shaped when viewed in side so as to include a low front portion, serving as a footboard 74, and to include a high rear portion, serving as seat mount base 75. Footboard 74 is extended horizontally rearward from a rear bottom end of front cover 38 so as to facilitate a driver's getting on-off vehicle 1 and to serve as a rest for the driver's feet. Seat mount base 75 has a vertical front end plate portion extended upward from a rear end of footboard 74, and a horizontal top plate portion extended rearward from a top of the vertical front end plate portion to partition plate 21. The vertical front end plate portion of seat mount base 75 is disposed forward of belt transmission 7, and the horizontal top plate portion of seat mount base 75 is disposed above belt transmission 7, and has a top opening 75a through which a person can access belt transmission 7 therebelow.

Driver's seat 47 is mounted at a bottom portion 47a thereof on the horizontal top plate portion of seat mount base 75 so as to cover top opening 75a. A stay 76 is extended upward and forward from a front top end of portion of seat mount base 75, and seat 47 is pivoted at a front end of bottom portion 47a by stay 76 via a pivot shaft 76a so as to be vertically rotatable in the fore-and-aft direction of vehicle 1. When a driver leaves seat 47 and seat 47 is rotated forward to be centered on pivot shaft 76a, bottom portion 47a of seat 47 is separated from the horizontal top plate portion of seat mount base 75 so as to open top opening 75a for facilitating access to belt transmission 7. In this way, power unit 5 overlaps seat 47 at belt transmission 7 thereof vertically, i.e., when viewed in plan, so that heavy power unit 5 and seat 47 on which a driver sits are disposed at a substantially fore-and-aft middle portion of vehicle 1 between front and rear transaxles 9 and 10 so as to balance vehicle 1 in the fore-and-aft direction thereof.

An input shaft 42 of front transaxle 9 is journalled by a rear portion of housing 40, and projects rearwardly outward from the rear portion of housing 40. In housing 40, a bevel gear 43 is fixed on a front end of input shaft 42, and meshes with a bevel input gear 44 of a bi-directive clutch device 41. On the other hand, a front propeller shaft 45 is extended forward from gear transmission 8 of power unit 5 coaxially to input shaft 42. Input shaft 42 is drivingly connected at the rear end thereof to a front end of front propeller shaft 45 via a coaxial joint 46, thereby receiving power outputted from gear transmission 8 of power unit 5.

Bi-directive clutch device 41 includes a pair of bi-directive clutches, and each of the bi-directive clutches has an inner rotor drivingly connected to each front axle 11, and has an outer rotor drivingly connected to input shaft 42. During either forward or backward normal traveling of vehicle 1, rotation of the outer rotor delays after rotation of the inner rotor so as to disengage the bi-directive clutch, thereby isolating corresponding front axle 11 and front wheel 13 from the rotary power of input shaft 42. Accordingly, vehicle 1 normally travels by driving only rear wheels 14, i.e., in a two-wheel drive mode.

When at least one of front and rear wheels 13 and 14 slips or is stuck during traveling of vehicle 1, the inner rotor drivingly connected to front axle 13 is slowed down. When the slowed down inner rotor comes to delay after the outer rotor, the bi-directive clutch is engaged. Therefore, the engaged bi-directive clutches transmits the rotary power of input shaft 42 to front axles 11 and front wheels 13, whereby vehicle 1 travels by driving both front wheels 13 and rear wheels 14, i.e., in a four-wheel drive mode, thereby escaping from the slipping or stuck condition. If the rotary speed of the inner rotor is recovered to exceed that of the outer rotor, the bi-directive clutch is disengaged to return vehicle 1 into the two-wheel drive mode. In this way, vehicle 1 stably travels in the automatically selected two-wheel drive mode or four-wheel drive mode.

Power unit 5, including engine 6, belt transmission 7 and gear transmission 8, will be described with reference to FIGS. 1 to 4. Engine 6 is arranged so that its crankshaft 6a, serving as an engine output shaft, has a horizontal axis extended in the fore-and-aft direction of vehicle 1. A front end of crankshaft 6a projects forward from a front end surface of engine 6, and is rigidly and coaxially connected to a drive pulley shaft 49 via a coaxial joint 48. Therefore, the front end of crankshaft 6a, coaxial joint 48 and drive pulley 49 serves as an end portion of engine output shaft 6a projecting forwardly outward from engine 6.

Gear transmission 8 is disposed on one of right and left sides of engine 6 (in this embodiment, on the left side of engine 5 as mentioned above). Gear transmission 8 includes a casing 55 in which a transmission input shaft 56, a transmission intermediate shaft 57 and a transmission output shaft 78 are journalled by bearings so as to have respective horizontal axes extended in the fore-and-aft direction of vehicle 1 in parallel to one another. Transmission input shaft 56 serves as an input shaft of gear transmission 8, and a front end of transmission input shaft 56 projects at a front end thereof forward from a front end surface of casing 55, and is rigidly and coaxially connected to a driven pulley shaft 50 via a coaxial joint 58. Therefore, the front end of transmission input shaft 56, coaxial joint 58 and driven pulley 50 serves as an end portion of transmission input shaft 56 projecting forwardly outward from gear transmission 8.

Belt transmission 7 includes a casing 51. Casing 51 has a pair of right and left joint portions, which are extended rearward and are joined at respective opened rear ends thereof to the respective front end surfaces of engine 6 and casing 55 of gear transmission 8. The joint portion of casing 51 joined to engine 6 encloses the front end of crankshaft 6a and coaxial joint 48. The joint portion of casing 51 joined to casing 55 encloses the front end of transmission input shaft 56 and coaxial joint 58.

In casing 51, drive pulley shaft 49 and driven pulley shaft 50 are journalled by bearings. A split pulley serving as a drive pulley 52 is provided on drive pulley shaft 49. A split pulley serving as a driven pulley 53 is provided on driven pulley shaft 50. A belt 54 is looped over drive and driven pulleys 52 and 53 so as to transmit the rotary power of drive pulley shaft 49 as the output rotary power of engine 6 to driven pulley shaft 50 and transmission input shaft 56. Belt 54 includes upper and lower portions between drive and driven pulleys 52 and 53. One of the upper and lower portions of belt 54 runs from drive pulley 52 to driven pulley 53. The other of the upper and lower portions of belt 54 runs from driven pulley 53 to drive pulley 52.

Pulley shafts 49 and 50 are disposed at equal heights so as to minimize the vertical length of entire belt transmission 7 so that belt transmission 7 can ensure sufficient spaces thereabove and therebelow. Alternatively, pulley shafts 49 and 50 may have any height difference therebetween at needs.

Belt transmission 7 is a continuously variable transmission (CVT). Grooves of respective drive and driven pulleys 52 and 53 fitting belt 54 therein have variable widths, which are automatically changed according to variation of the output rotary speed of engine 6 (i.e., the rotary speed of drive pulley shaft 49) and the like, so as to steplessly change a radius ratio between respective portions of belt 54 wound on drive pulley 52 and driven pulley 53, i.e., a speed ratio between pulley shafts 49 and 50. Alternatively, the grooves of drive and driven pulleys 52 and 53 may have fixed widths so as to have a constant speed ratio between pulley shafts 49 and 50.

Transmission output shaft 78 serving as an output shaft of gear transmission 8 projects at a front end portion forward from a front end surface of casing 55, and projects at a rear end thereof rearward from a rear end surface of casing 55. A front output shaft 77 penetrates a casing 51 of belt transmission 7 so as to extend coaxially to transmission output shaft 78. Front output shaft 77 is rigidly connected at a rear end thereof to the font end of transmission output shaft 78 via a coaxial joint 35 between a rear end surface of casing 51 and the front end surface of casing 55. The front end portion of transmission output shaft 78, coaxial joint 35 and front output shaft 77 serve as a front end portion of transmission output shaft 78 projecting forwardly outward from gear transmission 8.

Figure 4:
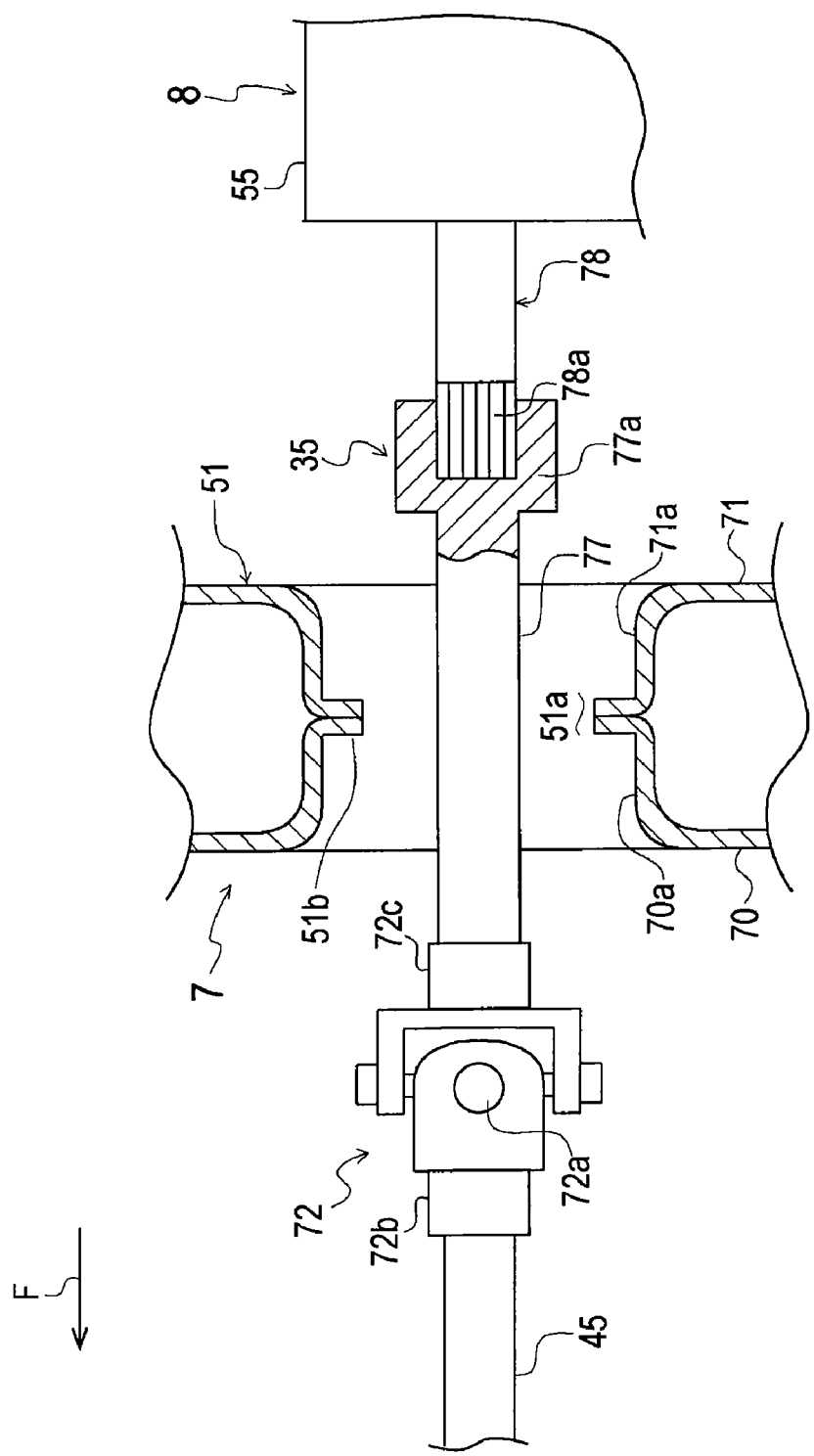
FIG. 4 is a fragmentary sectional plan view of power unit 5, showing a portion of a belt transmission 51 and an end portion of a transmission output shaft extended through the portion of belt transmission 51 to be connected to a propeller shaft.

In this regard, referring to FIG. 4, coaxial joint 35 is defined so that one shaft end having a splined outer peripheral surface is inserted into a recess of another shaft end having a splined inner peripheral surface. To connect shafts 77 and 78, coaxial joint 35 is configured so that a rear end 77a of front output shaft 77 is formed with a rearwardly opened recess having a splined inner peripheral surface, a front end 78a of transmission output shaft 78 is splined on an outer peripheral surface thereof, and front end 78a of transmission output shaft 78 is inserted into the recess of rear end 77a of front output shaft 77 so as to spline-fit the outer peripheral surface of front end 78a to the inner peripheral surface of recess of rear end 77a, whereby shafts 77 and 78 are coaxially connected to each other so as to be unrotatable relative to each other.

Front output shaft 77 is extended through a portion of belt transmission 7 between drive and driven pulleys 52 and 53 and between the upper and lower portions of belt 54 so as to have a front end thereof forwardly outward from a front end surface of casing 51 of belt transmission 7, so that the front end of front output shaft is adapted to be drivingly connected to input shaft 42 of front transaxle 9.

Input shaft 42, front output shaft 77 and front propeller shaft 45 interposed between input shaft 42 and front output shaft 77 are disposed coaxially to one another. As mentioned above, front propeller shaft 45 is rigidly connected at the front end thereof to input shaft 42 via coaxial joint 46. However, front propeller shaft 45 is connected at a rear end portion to the front end of front propeller shaft 45 via a universal joint 72. Universal joint 72 absorbs axial deviation of front propeller shaft 45 and input shaft 42 from front output shaft 77, thereby reducing required accuracy in relative arrangement of front transaxle 9 and power unit for ensuring the coaxial arrangement of shafts 77, 45 and 42.

In this regard, referring to FIG. 4, universal joint 72 includes a cross-shaped pivot pin 72a, a first shaft joint member 72b and a second shaft joint member 72c. First and second shaft joint members 72b and 72c are pivotally connected to each other via pivot pin 72a so as to be rotatable relative to each other in substantially all directions. First shaft joint member 72b is fixed to an end of one shaft, and second shaft joint member 72c is fixed to an end of another shaft, so that axes of the shafts cross each other at pivot pin 72a, and a power transmission course formed by the axes of the shafts is freely bendable at pivot pin 72a, thereby enabling power transmission between the shafts which are not coaxial to each other, or thereby absorbing axial deviation of the shafts which properly need to be coaxial to each other.

In the embodiment shown in FIG. 4, first shaft joint member 72b is fixed to the rear end of front propeller shaft 45, and second shaft joint member 72c is fixed to the front end of front output shaft 77. Shafts 45 and 77 properly need to be coaxial to each other, however, even if shafts 45 and 77 have a little axial deviation, universal joint 72 having the above-mentioned structure absorbs the axial deviation, thereby reducing required accuracy in coaxial arrangement of shafts 45 and 77. For another effect, due to the coaxial arrangement of shafts 45 and 77, the power transmission course in universal joint 72 has little bending at pivot pin 72a so as to greatly reduce noise or vibration caused by the bending of power transmission course.

In casing 55, a gear 59 fixed on transmission input shaft 56 meshes with a gear 60 fixed on a front portion of transmission intermediate shaft 57, so that the rotary power of transmission input shaft 56 (and driven pulley shaft 50) is transmitted to transmission intermediate shaft 57 via gears 59 and 60. A forward-traveling low speed drive gear 61 and a backward-traveling drive gear 63 are fitted on transmission intermediate shaft 57 rearward of gear 60 so as to be rotatable relative to shaft 57, and a forward-traveling high speed drive gear 62 is fitted on a central boss of gear 61 so as to be rotatable relative to gear 61. Driven gears 64, 65 and 66 are fixed on transmission output shaft 78. Driven gear 64 directly meshes with forward-traveling low speed drive gear 61, so that gears 61 and 64 serve as a forward-traveling low speed gear train. Driven gear 65 directly meshes with forward-traveling high speed drive gear 62, so that gears 62 and 65 serve as a forward-traveling high speed gear train. Driven gear 66 meshes with backward-traveling drive gear 63 via an idle gear 67, so that gears 63, 67 and 66 serve as a backward-traveling gear train.

A central boss of forward-traveling high speed drive gear 62 is extended axially rearward so as to have a rear end formed with clutch teeth 62a. The central boss of forward-traveling low sped drive gear 61 is extended axially rearward so as to have a rear end formed with clutch teeth 61a rearward from clutch teeth 62a. A central boss of backward-traveling drive gear 63 is extended axially forward so as to have a front end formed with clutch teeth 63a. A spline hub 68 is fixed on transmission intermediate shaft 57 between clutch teeth 61a and 63a. A clutch slider 69 is fitted on spline hub 68 so as to be unrotatable relative to spline hub 68 and be axially slidable.

Clutch slider 69 is operatively connected to a speed shift operation device, such as a lever, in vehicle 1 so as to axially slide to be shifted among four positions, i.e., a forward-traveling high speed position, a forward-traveling low speed position, a neutral position and a backward-traveling position. When clutch slider 69 meshes with only clutch teeth 62a at the forward-traveling high speed position, the rotary power of transmission intermediate shaft 57 is transmitted to transmission output shaft 78 via gears 62 and 65 serving as the forward-traveling high speed gear train, so as to rotate transmission output shaft 78 for high speed forward traveling of vehicle 1. When clutch slider 69 meshes with only clutch teeth 61a at the forward-traveling low speed position, the rotary power of transmission intermediate shaft 57 is transmitted to transmission output shaft 78 via gears 61 and 64 serving as the forward-traveling low speed gear train, so as to rotate transmission output shaft 78 for low speed forward traveling of vehicle 1. When clutch slider 69 meshes with none of clutch teeth 61a, 62a and 63a at the neutral position, transmission output shaft 78 is isolated from the rotary power of transmission intermediate shaft 57. When clutch slider 69 meshes with only clutch teeth 63a at the backward-traveling position, the rotary power of transmission intermediate shaft 57 is transmitted to transmission output shaft 78 via gears 63, 67 and 66 serving as the backward-traveling gear train, so as to rotate transmission output shaft 78 for backward traveling of vehicle 1.

As shown in FIGS. 1 to 4, a front casing 70 and a rear casing 71 are separably joined to each other so as to constitute casing 51 of belt transmission 7. A vertical front end surface of front casing 70 is formed at a substantially center portion thereof when viewed in front with a rearwardly extended cylindrical portion 70a. A vertical rear end surface of rear casing 71 is formed at a substantially center portion thereof when viewed in front with a forwardly extended cylindrical portion 71a. By joining front and rear casings 70 and 71 to each other, cylindrical portions 70a and 71a are joined to each other so that belt transmission 7 is formed with a fore-and-aft cylindrical penetration passage 51a. Penetration passage 51a is formed between drive and driven pulleys 52 and 53 and between the upper and lower portions of belt 54.

Front output shaft 77 is horizontally extended in the fore-and-aft direction of vehicle 1 through penetration passage 51a so as to penetrate belt transmission 7. An inner peripheral surface of penetration passage 51a is spaced from an outer peripheral surface of front output shaft 77 in penetration passage 51a so as to prevent the outer peripheral surface of front output shaft 77 from touching a projection 51b formed by joined flanges of cylindrical portions 70a and 71a of front and rear casings 70 and 71 even if front output shaft 77 or belt transmission 7 vibrates.

Hereinafter, referring to alternative vehicles equipped with alternative power units shown in FIGS. 5 to 10, only features different from the foregoing features will be described on the assumption that members and portions designated by the foregoing reference numerals have the same features and functions.

Figure 5:
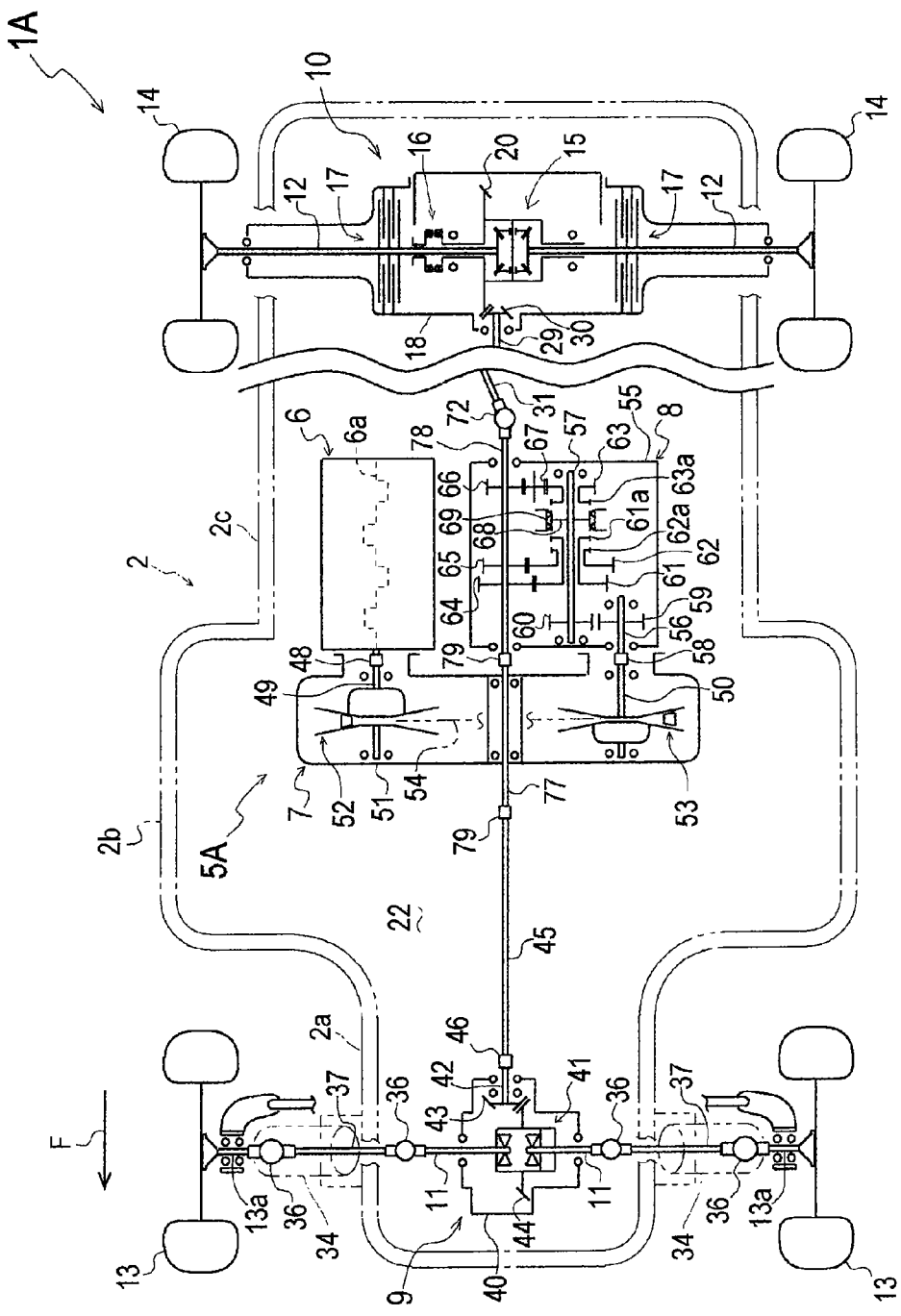
FIG. 5 is a skeleton diagram as a schematic plan view of a power transmission system in the four-wheel drive utility vehicle equipped with an alternative power unit 5A.
Figure 6:
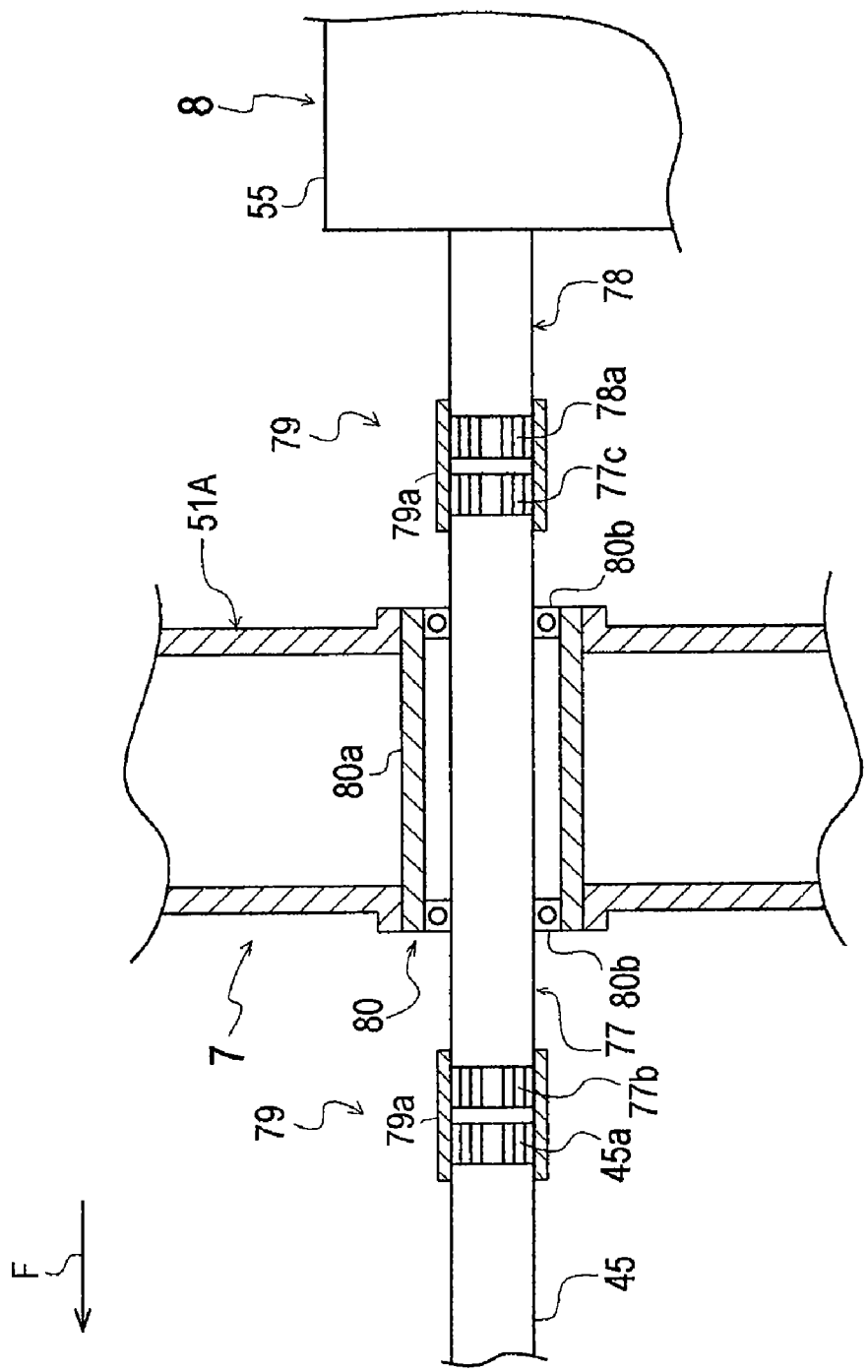
FIG. 6 is a fragmentary sectional plan view of power unit 5A, showing a portion of a belt transmission 51A and an end portion of a transmission output shaft extended through the portion of belt transmission 51 to be connected to a propeller shaft.

Referring to FIGS. 5 and 6, a four-wheel drive utility vehicle 1A is equipped with a power unit 5A. In power unit 5A, an alternative casing 51A of belt transmission 7 includes a bearing portion 80 between drive and driven pulleys 52 and 53 and between the upper and lower portions of belt 54. Bearing portion 80 includes a horizontal fore-and-aft axial collar 80a, which penetrates casing 51A so as to have a front open end at a front end surface of casing 51A, and have a rear open end at a rear end surface of casing 51A. Collar 80a is provided therein with a pair of front and rear bearings 80b at front and rear ends thereof. Front output shaft 77 is journalled by front and rear bearings 80b and is passed through collar 80a, thereby penetrating belt transmission 7.

Therefore, in comparison with front output shaft 77 of power unit 5 freely passed through the space in penetration passage 51a, front output shaft 77 of power unit 5A, supported by bearing portion 80 of belt transmission 7, is proof against axial deviation during rotation, thereby enabling rigid connection of front and rear ends of front output shaft 77 to shafts 45 and 78 via coaxial joints 79 as follows.

Front output shaft 77 is rigidly and coaxially connected at a rear end thereof to the front end of transmission output shaft 78 via a rear coaxial joint 79 between a rear end surface of casing 51A of belt transmission 7 and the front end surface of casing 55 of gear transmission 8, and also is rigidly and coaxially connected at a front end thereof to the rear end of front propeller shaft 45 via a front coaxial joint 79 forward from a front end surface of casing 51A.

As shown in FIG. 6, each coaxial joint 79 includes a sleeve 79a serving as a cylindrical member, having opposite open ends and a splined inner peripheral surface, and is defined so that one shaft end having a splined outer peripheral surface and another shaft end having a splined outer peripheral surface are inserted into sleeve 79a via the respective opposite open ends so as to be spline-fitted to sleeve 79a. To constitute front and rear coaxial joints 79 for power unit 5A in vehicle 1A, front output shaft 77 has front and rear ends 77b and 77c splined at outer peripheral surfaces thereof, front end 78a of transmission output shaft 78 projecting forward from the front end surface of casing 55 is splined at the outer peripheral surface thereof, and a rear end 45a of front propeller shaft 45 is splined at an outer peripheral surface thereof.

In front coaxial joint 79, rear end 45a of front propeller shaft 45 is inserted into sleeve 79a via the front open end of sleeve 79a, and front end 77b of front output shaft 77 is inserted into sleeve 79a via the rear open end of sleeve 79a, so that the splined inner peripheral surface of sleeve 79a is fitted to the splined outer peripheral surface of rear end 45a of front propeller shaft 45 and to the splined outer peripheral surface of front end 77b of front output shaft 77. In rear coaxial joint 79, rear end 77c of front output shaft 77 is inserted into sleeve 79a via the front open end of sleeve 79a, and front end 78a of transmission output shaft 78 is inserted into sleeve 79a via the rear open end of sleeve 79a, so that the splined inner peripheral surface of sleeve 79a is fitted to the splined outer peripheral surface of rear end 77c of front output shaft 77 and to the splined outer peripheral surface of front end 78a of transmission output shaft 78.

Therefore, in vehicle 1A equipped with power unit 5A, the rigid and coaxial connection of shafts 45, 77 and 78 with coaxial joints 79 and bearing portion 80 of belt transmission 7 reduces noise and vibration, and prolongs life of components.

In power unit 5A, similar to power unit 5, universal joint 72 is provided on the rear end of transmission output shaft 78 so as to be connected to the front end of propeller shaft 31, which is connected at the rear end thereof to input shaft 29 of rear transaxle 10 via universal joint 32 similar to that shown in FIG. 1 (not shown in FIG. 5). Due to universal joints 72 and 32, propeller shaft 31 can be slanted to connect transmission output shaft 78 and input shaft 29 which are not coaxial to each other.

Incidentally, coaxial joint 46 in each of vehicles 1 and 1A, connecting the rear end of input shaft 42 of front transaxle 9 to the front end of front propeller shaft 45, may be configured similar to either coaxial joint 35 shown in FIG. 4 with no cylindrical member or coaxial joint 79 shown in FIG. 6 with the cylindrical member, i.e., sleeve 79a. Further, alternatively, coaxial joint 35 in vehicle 1 may be replaced with coaxial joint 79, and at least one of coaxial joints 79 in vehicle 1A may be replaced with coaxial joint 35. These things are also adaptable to vehicles 1B, 1C, 1D and 1E described later.

Figure 7:
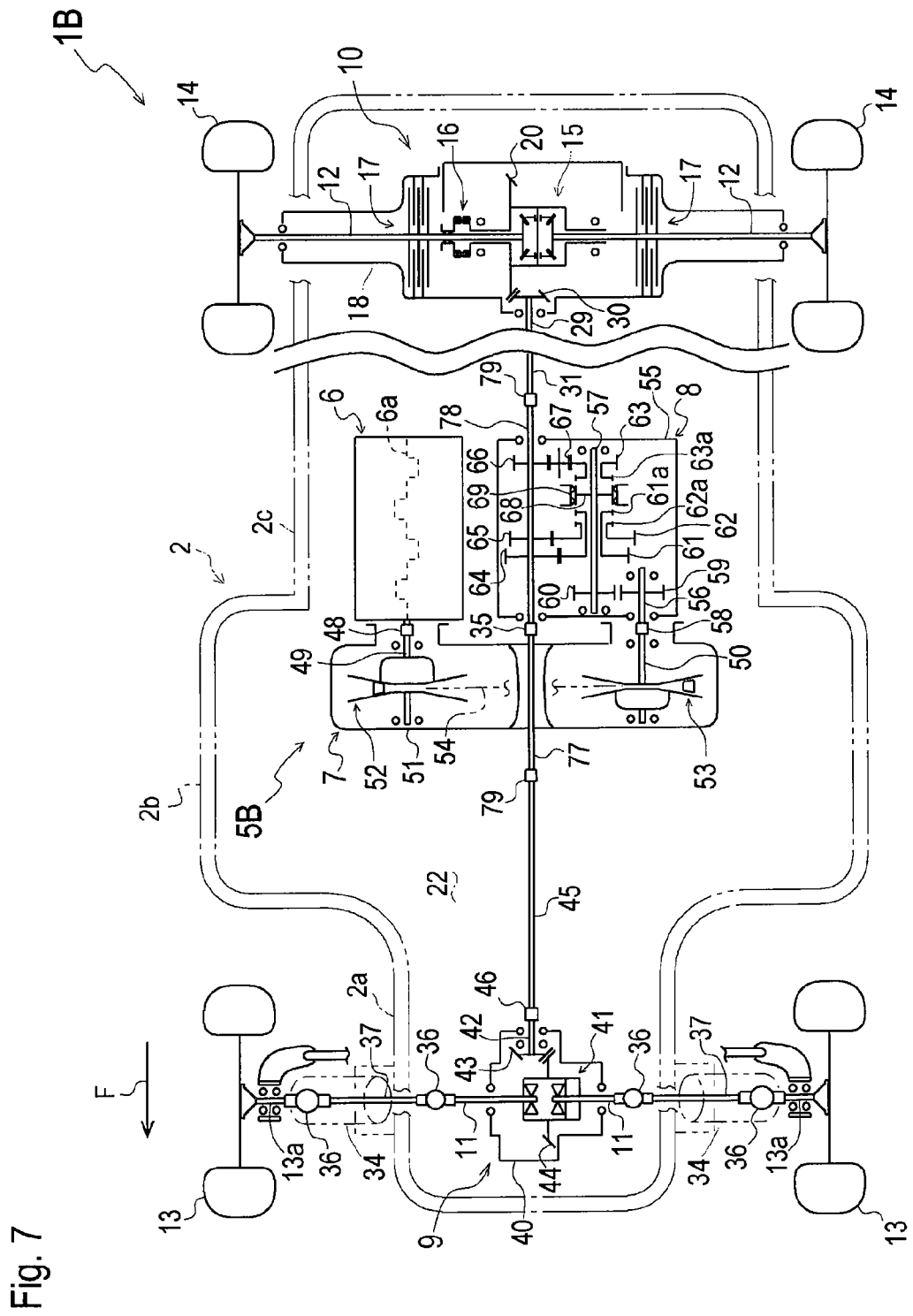
FIG. 7 is a skeleton diagram as a schematic plan view of a power transmission system in the four-wheel drive utility vehicle equipped with an alternative power unit 5B.

Referring to FIG. 7, a four-wheel drive utility vehicle 1B is equipped with a power unit 5B. In vehicle 1B, input shaft 29 of rear transaxle 10 is also disposed coaxially to transmission output shaft 78 in addition to the coaxial arrangement of shafts 78, 77, 45 and 42 connected via coaxial joints 35, 79 and 46. To correspond to the coaxial arrangement of shafts 78 and 29, power unit 5B of vehicle 1B includes coaxial joint 79 provided on the rear end of transmission output shaft 78. Propeller shaft 31 is disposed coaxially to shafts 78 and 29, is rigidly and coaxially connected at the front end thereof to the rear end of transmission output shaft 78 via coaxial joint 79. Propeller shaft 31 is connected at the rear end thereof to the front end of input shaft 29 of rear transaxle 10 via coaxial joint 79 or 35 (not shown in FIG. 7) or may be connected via universal joint 72 for absorbing coaxial deviation of shafts 31 and 29.

In power unit 5B, belt transmission 7 includes casing 51 having penetration passage 51a as shown in FIG. 4, through which front output shaft 77 is passed. Alternatively, belt transmission 7 may have casing 51A having bearing portion 80 for firmly journaling front output shaft 77 so as to surely eliminate axial deviation in coaxially arranged shafts 42, 45, 77, 78, 31 and 29. The same thing is adaptable to vehicles 1C, 1D and 1E with respective power units 5C, 5D and 5E described later.

Figure 8:
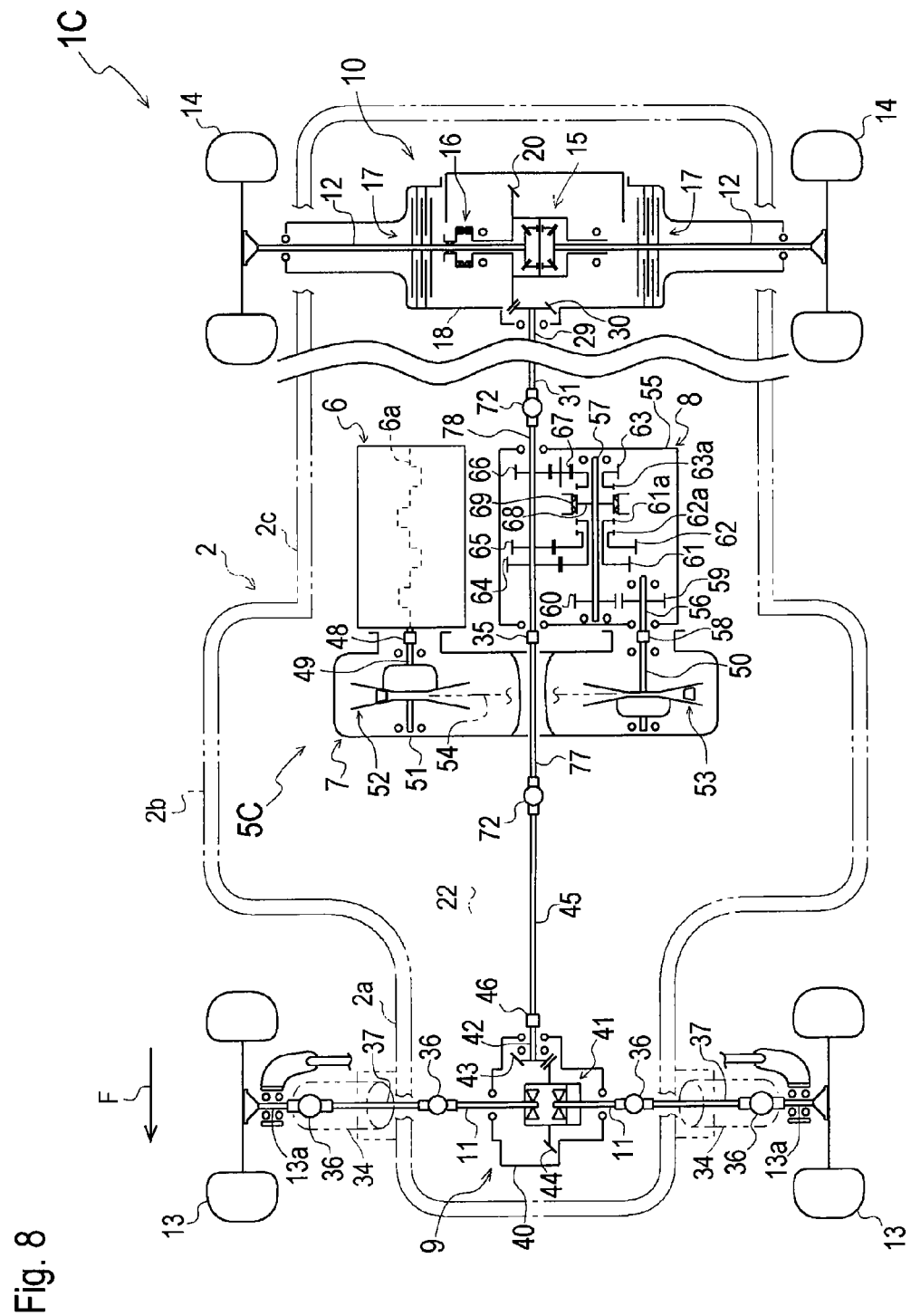
FIG. 8 is a skeleton diagram as a schematic plan view of a power transmission system in the four-wheel drive utility vehicle equipped with an alternative power unit 5C.

Referring to FIG. 8, a four-wheel drive utility vehicle 1C is equipped with a power unit 5C. In vehicle 1C, shafts 42, 45, 77, 78, 31 and 29 are disposed coaxially to one another, similar to those in vehicle 1B. However, in power unit 5C, respective universal joints 72 are provided on the front end of front output shaft 77, and on the rear end of transmission output shaft 78. That is, front universal joint 72 is interposed between front propeller shaft 45 and front output shaft 77, and rear universal joint 72 is interposed between transmission output shaft 78 and rear propeller shaft 31, thereby absorbing axial deviation of the shafts. From another viewpoint, due to the coaxial arrangement of shafts 45, 77, 78 and 31, power transmission courses in front and rear universal joints 72 have little bending at respective pivot pins 72a (see FIG. 4) so as to greatly reduce noise or vibration caused by the bending of power transmission courses.

Figure 9:
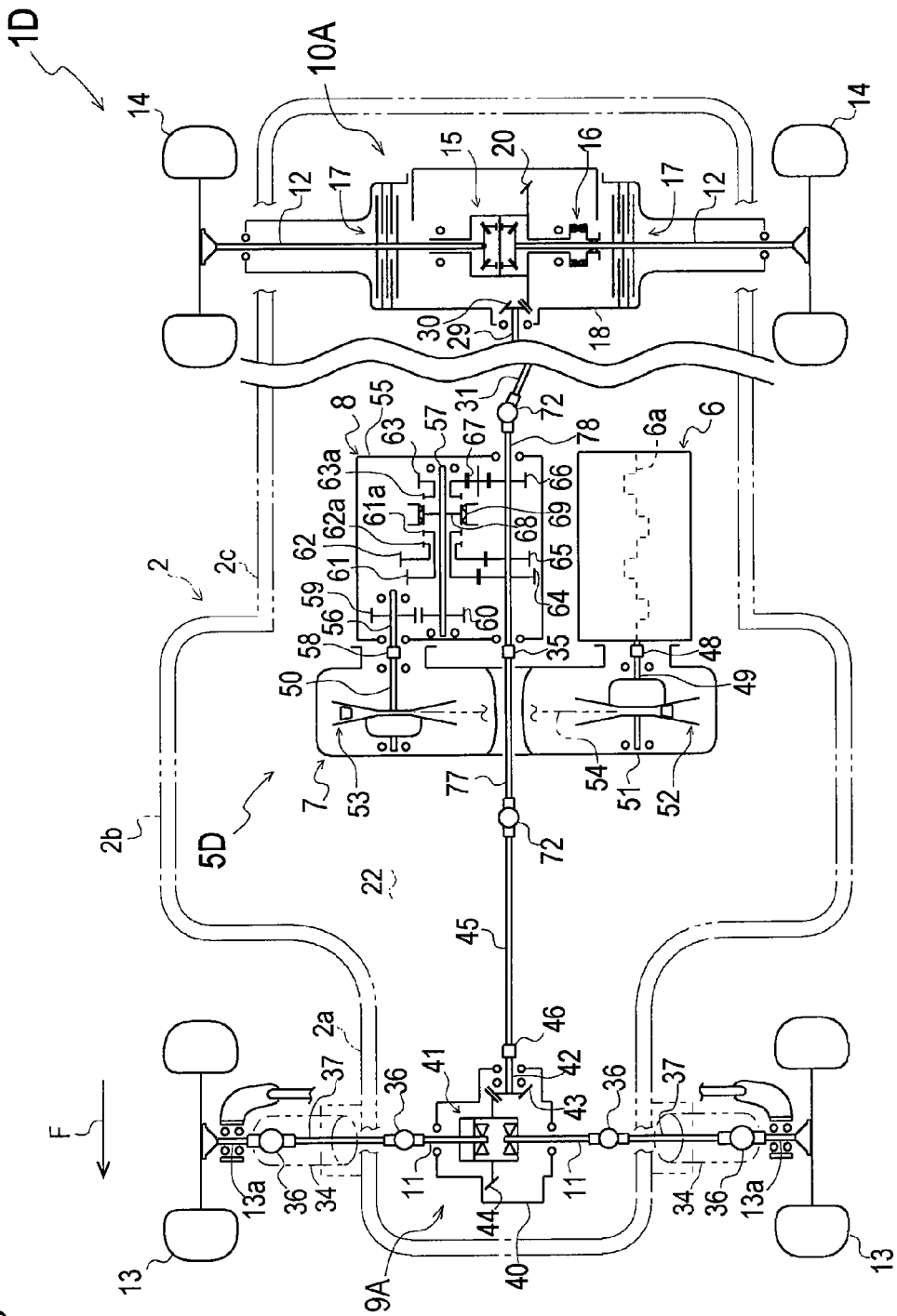
FIG. 9 is a skeleton diagram as a schematic plan view of a power transmission system in the four-wheel drive utility vehicle equipped with an alternative power unit 5D.

Referring to FIG. 9, a four-wheel drive utility vehicle 1D is equipped with a power unit 5D. Power unit 5D is adapted so as to arrange engine 6 leftward in a vehicle and gear transmission 8 rightward in the vehicle on an assumption that belt transmission 7 is disposed forward from engine 6 and gear transmission 8, and is configured as a mirror image of power unit 5 in the lateral direction of the vehicle, especially, in the arrangement of the gear mechanism of gear transmission 8 in casing 55 and in the arrangement of drive and driven pulleys 52 and 53 in belt transmission 7. Either power unit 5 (5A, 5B or 5C) having right engine 6 and left gear transmission 8 or power unit 5D having left engine 6 and right gear transmission 8 may be selected to correspond to a design of a vehicle adopting the power unit.

Vehicle 1D includes a front transaxle 9A and a rear transaxle 10A, configured as mirror images of front transaxle 9 and rear transaxle 10 (in vehicle 1, 1A, 1B or 1C), respectively, in the lateral direction of the vehicle. In front transaxle 9A, bevel gear 43 on input shaft 42 meshes at a portion thereof rightward from the axis of input shaft 42 with bevel input gear 44 of bi-directive clutch device 41, in comparison with bevel gear 43 of front transaxle 9 meshes at a portion thereof leftward from the axis of input shaft 42 with bevel input gear 44. The rotary direction of front axles 11 of front transaxle 9A relative to the rotary direction of front propeller shaft 45 (i.e., the rotary direction of transmission output shaft 78 as the output rotary direction of power unit 5D) is opposite to the rotary direction of front axles 11 of front transaxle 9 relative to the rotary direction of front propeller shaft 45.

Similarly, in rear transaxle 10A, bevel gear 30 on input shaft 29 meshes at a portion thereof leftward from the axis of input shaft 29 with bevel input gear 20 of differential unit 15, in comparison with bevel gear 30 of rear transaxle 10 meshes at a portion thereof rightward from the axis of input shaft 29 with bevel input gear 20. The rotary direction of rear axles 12 of rear transaxle 10A relative to the rotary direction of rear propeller shaft 31 (i.e., the rotary direction of transmission output shaft 78 as the output rotary direction of power unit 5D) is opposite to the rotary direction of rear axles 12 of rear transaxle 10 relative to the rotary direction of rear propeller shaft 31.

Whether each of bevel gears 43 and 30 meshes with corresponding bevel input gear 44 or 20 at the portion thereof leftward from the axis of corresponding input shaft 42 or 29 or at the portion thereof rightward from the axis of corresponding input shaft 42 or 29 depends on the rotary direction of transmission output shaft 78 for forward traveling (or backward traveling) of the vehicle. That is, either front transaxle 9 or 9A and either rear transaxle 10 or 10A are selected for properly rotating axles 11 and 12 in correspondence to which direction transmission output shaft 78 is adapted to rotate for either forward or backward traveling direction of the vehicle. If transmission output shaft 78 is rotated clockwise (when viewed in front) for forward traveling of the vehicle, transaxles 9A and 10A are selected so as to convert the clockwise rotation of transmission output shaft 78 into forward traveling rotation of axles 11 and 12. If transmission output shaft 78 is rotated counterclockwise (when viewed in front) for forward traveling of the vehicle, transaxles 9 and 10 are selected so as to convert the counterclockwise rotation of transmission output shaft 78 into forward traveling rotation of axles 11 and 12.

Incidentally, as understood, in which direction transmission output shaft 78 rotates for forward traveling of the vehicle has no association with selection of either power unit 5 (5A, 5B or 5C) or power unit 5D. If the configuration of power unit 5D for transmitting power from engine output shaft 6a to transmission output shaft 78 is identical to that of power unit 5 except for the lateral symmetry, whether transmission output shaft 78 is rotated clockwise or counterclockwise for forward traveling of the vehicle depends on which direction engine output shaft 6a is rotated.

Figure 10:
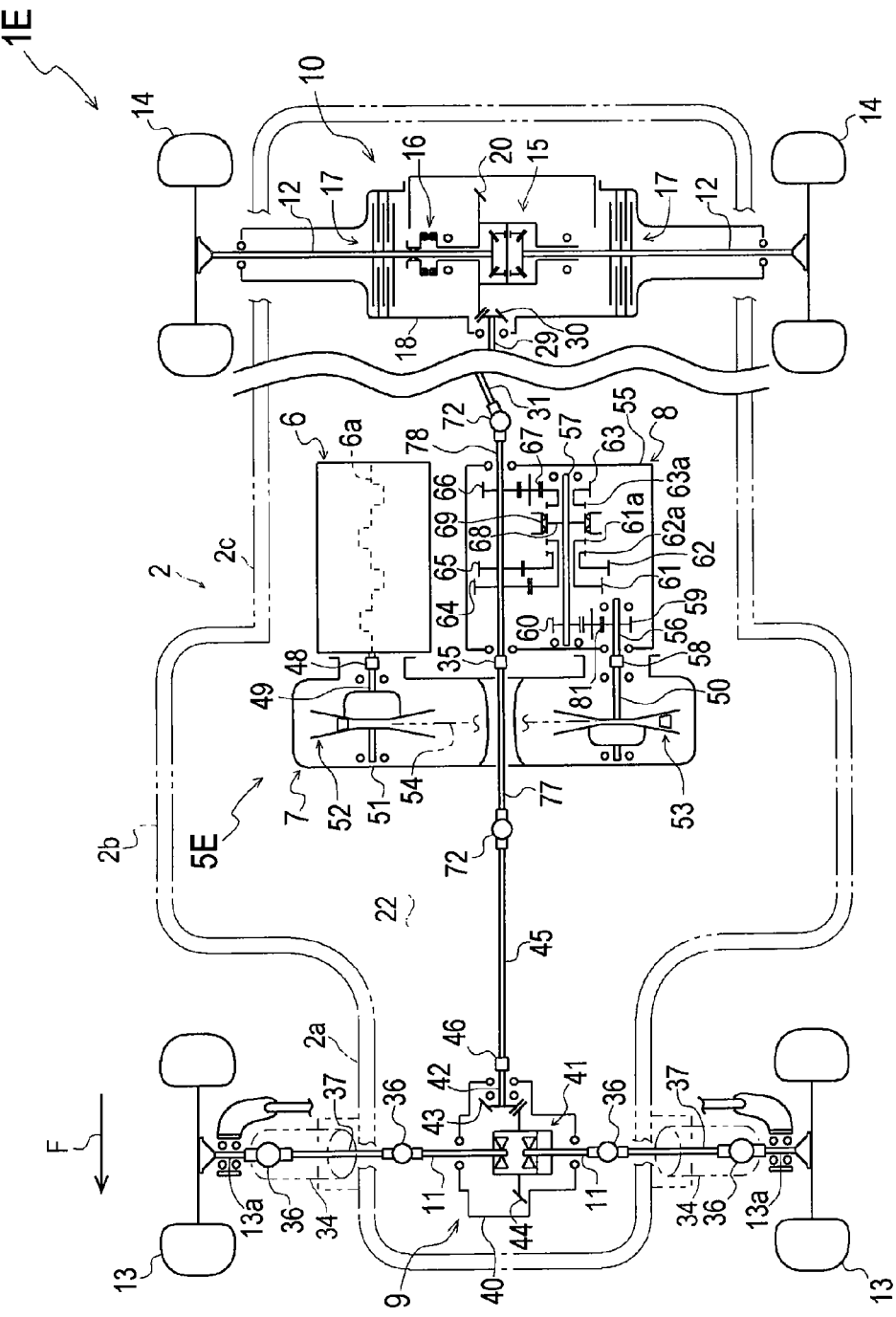
FIG. 10 is a skeleton diagram as a schematic plan view of a power transmission system in the four-wheel drive utility vehicle equipped with an alternative power unit 5E.

Referring to FIG. 10, a four-wheel drive utility vehicle 1E is equipped with a power unit 5E. The only difference of power unit 5E from power unit 5 is an idling gear 81 in casing 55 of gear transmission 8, interposed between gear 59 on transmission input shaft 56 and gear 60 on transmission intermediate shaft 57. The rotary direction of transmission output shaft 78 of power unit 5E relative to the rotary direction of engine output shaft 6a is opposite to the rotary direction of transmission output shaft 78 of power unit 5 relative to the rotary direction of engine output shaft 6a. In this regard, vehicle 1E includes front and rear transaxles 9 and 10. This means that the rotary directions of axles 11 and 12 of vehicle 1E relative to the rotary direction of transmission output shaft 78 is the same as the rotary directions of axles 11 and 12 of vehicle 1 relative to the rotary direction of transmission output shaft 78, and the rotary direction of engine output shaft 6a of power unit 5A is opposite to the rotary direction of engine output shaft 6a of power unit 5. In other words, either power unit 5 (5A, 5B or 5C) without idling gear 81 or power unit 5E with idling gear 81 can be selected in correspondence to whether transmission output shaft 78 has to be rotated in the same direction with engine output shaft 6a or opposite to engine output shaft 6a.

It is further understood by those skilled in the art that the foregoing description is given as preferred embodiments of the disclosed apparatuses and vehicles and that various changes and modifications may be made in the invention without departing from the scope thereof defined by the following claims.

What is claimed is:

1. A power unit comprising:
an engine including an engine output shaft having an end portion projecting outward from the engine;
a belt transmission driven by the engine; and
a second transmission driven by the belt transmission, the second transmission including a transmission input shaft and a transmission output shaft having respective end portions projecting outward from the second transmission;
wherein the belt transmission includes a drive pulley provided on the end portion of the engine output shaft, a driven pulley provided on the end portion of the transmission input shaft, a belt looped over the drive and driven pulleys,
wherein the belt has first and second portions extended between the drive and driven pulleys, the first portion running from the drive pulley to the driven pulley, and the second portion running from the driven pulley to the drive pulley, and
wherein the end portion of the transmission output shaft is extended through a portion of the belt transmission between the drive and driven pulleys and between the first and second portions of the belt so as to project outward from the belt transmission.

2. The power unit according to claim 1, wherein the engine output shaft, the transmission input shaft and the transmission output shaft are disposed at substantially equal heights.

3. The power unit according to claim 1, wherein the transmission output shaft has another end portion projecting outward from the second transmission opposite to the belt transmission.

4. The power unit according to claim 1,
wherein the belt transmission includes a casing having first and second end surfaces opposite each other,
wherein the first end surface of the casing faces the engine and the second transmission,
wherein the casing has a chamber therein between the first and second end surfaces,
wherein the belt and the drive and driven pulleys are disposed in the chamber of the casing,
wherein the casing has an inner peripheral surface extended between the first and second end surfaces so that the inner peripheral surface defines a cylindrical penetration passage, which is isolated from the chamber of the casing and is open outward at the first and second end surfaces, and
wherein the end portion of the transmission output shaft is extended through the cylindrical penetration passage so as to project outward from the second end surface of the casing of the belt transmission.

5. The power unit according to claim 4,
wherein the casing of the belt transmission includes first and second casing parts,
wherein the first casing part has the first end surface and a first cylindrical portion,
wherein the second casing part has the second end surface and a second cylindrical portion, and
wherein the first and second casing parts are joined to each other so as to constitute the casing with the chamber and the cylindrical penetration passage formed by joining the first and second cylindrical portions.

6. A vehicle comprising:
a power unit including an engine, a belt transmission driven by the engine, and a second transmission driven by the belt transmission;
a front transaxle driven by the second transmission; and
a rear transaxle driven by the second transmission,
wherein the engine and the second transmission are aligned in the lateral direction of the vehicle, and the belt transmission is disposed forward or rearward of the engine and the second transmission,
wherein the engine includes an engine output shaft extended in the fore-and-aft direction of the vehicle so as to have an end portion projecting forwardly or rearwardly outward from the engine,
wherein the second transmission includes a transmission input shaft, extended in the fore-and-aft direction of the vehicle so as to have an end portion projecting forwardly or rearwardly outward from the second transmission, and a transmission output shaft, extended in the fore-and-aft direction of the vehicle so as to have a pair of front and rear end portions projecting forwardly and rearwardly outward from the second transmission opposite to each other,
wherein the front end portion of the transmission output shaft is drivingly connected to the front transaxle, and the rear end portion of the transmission output shaft is drivingly connected to the rear transaxle,
wherein the belt transmission includes a drive pulley provided on the end portion of the engine output shaft, a driven pulley provided on the end portion of the transmission input shaft, a belt looped over the drive and driven pulleys,
wherein the belt has first and second portions extended between the drive and driven pulleys, the first portion running from the drive pulley to the driven pulley, and the second portion running from the driven pulley to the drive pulley, and
wherein the front or rear end portion of the transmission output shaft is extended through a portion of the belt transmission between the drive and driven pulleys and between the first and second portions of the belt so as to project outward from the belt transmission.

7. The vehicle according to claim 6, further comprising:
a propeller shaft; and
a pair of joints provided on respective opposite ends of the propeller shaft,
wherein at least one the front and rear transaxles is drivingly connected to the corresponding front or rear end portion of the transmission output shaft via the propeller shaft and the pair of joints.

8. The vehicle according to claim 7, wherein the joints are universal joints.

9. The vehicle according to claim 7, wherein the propeller shaft and the transmission output shaft are extended coaxially to each other via the joints.

10. The vehicle according to claim 9, wherein at least one of the joints is a universal joint.

11. The vehicle according to claim 9, wherein at least one of the joints is a coaxial joint.

12. The vehicle according to claim 11, wherein the coaxial joint is configured so that an end of one shaft having a splined outer peripheral surface is inserted into an end of the other shaft having a splined inner peripheral surface.

13. The vehicle according to claim 11, wherein the coaxial joint includes a cylindrical member having opposite open ends and a splined inner peripheral surface, and wherein ends of the shafts having respective splined outer peripheral surfaces are inserted into the cylindrical members through the respective opposite open ends of the cylindrical member so that the cylindrical member is fitted at the splined inner peripheral surface thereof on the splined outer peripheral surfaces of the ends of the respective shafts.

14. The vehicle according to claim 6, further comprising:
a base covering the belt transmission of the power unit, the base having an opening; and
a driver's seat mounted on the base so as to cover the opening, wherein the seat is movable so as to open the opening of the base for enabling access to the belt transmission via the opening.

15. The vehicle according to claim 6, further comprising:
a driver's seat, wherein the power unit is disposed at a fore-and-aft intermediate portion of the vehicle between the front and rear transaxles so as to overlap the seat when viewed in plan.

16. The vehicle according to claim 6,
wherein the engine output shaft and the transmission input shaft are disposed at equal heights so that the transmission input shaft and the transmission output shaft have a minimal vertical gap therebetween.

17. The vehicle according to claim 6,
wherein the belt transmission includes a casing having front and rear end surfaces opposite each other,
wherein one of the front and rear end surfaces of the casing faces the engine and the second transmission,
wherein the casing has a chamber therein between the front and rear end surfaces,
wherein the belt and the drive and driven pulleys are disposed in the chamber of the casing,
wherein the casing has an inner peripheral surface extended between the front and rear end surfaces so that the inner peripheral surface defines a fore-and-aft cylindrical penetration passage, which is isolated from the chamber of the casing and is open outward at the front and rear end surfaces, and
wherein the front or rear end portion of the transmission output shaft is extended through the cylindrical penetration passage so as to project outward from the front or rear end surface of the casing of the belt transmission opposite the front or rear end surface of the casing facing the engine and the second transmission.

18. The vehicle according to claim 17,
wherein the casing of the belt transmission includes front and rear casing parts,
wherein the front casing part has the front end surface and a front cylindrical portion,
wherein the rear casing part has the rear end surface and a rear cylindrical portion, and
wherein the front and rear casing parts are joined to each other so as to constitute the casing with the chamber and the cylindrical penetration passage formed by joining the front and rear cylindrical portions.

* * * * *